(12) United States Patent
Nilsson et al.

(10) Patent No.: US 12,171,016 B2
(45) Date of Patent: Dec. 17, 2024

(54) INTERFERENCE HANDLING AT RADIO ACCESS NETWORK NODES

(71) Applicant: Telefonaktiebolaget LM Ericsson (publ), Stockholm (SE)

(72) Inventors: Andreas Nilsson, Gothenburg (SE); Sven Petersson, Sävedalen (SE); Fredrik Athley, Kullavik (SE); Roy Timo, Kungsängen (SE); Xinlin Zhang, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 527 days.

(21) Appl. No.: 17/625,225

(22) PCT Filed: Jul. 9, 2019

(86) PCT No.: PCT/SE2019/050683
§ 371 (c)(1),
(2) Date: Jan. 6, 2022

(87) PCT Pub. No.: WO2021/006780
PCT Pub. Date: Jan. 14, 2021

(65) Prior Publication Data
US 2022/0248419 A1    Aug. 4, 2022

(51) Int. Cl.
*H04W 72/542* (2023.01)
*H04L 5/00* (2006.01)
(Continued)

(52) U.S. Cl.
CPC ......... *H04W 72/542* (2023.01); *H04L 5/0051* (2013.01); *H04W 72/0446* (2013.01); *H04W 72/0453* (2013.01); *H04W 72/1268* (2013.01)

(58) Field of Classification Search
CPC .............................. H04W 72/542; H04W 72/27
See application file for complete search history.

(56) References Cited

U.S. PATENT DOCUMENTS

2014/0140295 A1   5/2014  Manssour
2014/0148179 A1   5/2014  Das et al.
(Continued)

FOREIGN PATENT DOCUMENTS

WO    2019/029697 A1    2/2019

OTHER PUBLICATIONS

Oppo, "Discussion on network coordination mechanism(s) for CLI", 3GPP TSG RAN WG1 #96, R1-1902707, Athens, Greece, Feb. 25-Mar. 1, 2019 (6 pages).
(Continued)

*Primary Examiner* — Bo Hui A Zhu
(74) *Attorney, Agent, or Firm* — Rothwell, Figg, Ernst & Manbeck, P.C.

(57) ABSTRACT

There is provided mechanisms for interference handling. A method is performed by a radio access network node. The method comprises obtaining an indication of interference in a time/frequency interval. The method comprises querying a neighbouring radio access network node about scheduling in the time/frequency interval of uplink wireless transmission from any terminal device served by the neighbouring radio access network node. The method comprises receiving a response from the neighbouring radio access network node. The response comprises information identifying uplink reference signal resources/ports, and their scheduling, as to be used by the terminal device scheduled in the time/frequency interval.

20 Claims, 12 Drawing Sheets

(51) Int. Cl.
*H04W 72/0446* (2023.01)
*H04W 72/0453* (2023.01)
*H04W 72/1268* (2023.01)

(56) References Cited

U.S. PATENT DOCUMENTS

| | | |
|---|---|---|
| 2014/0274096 A1 | 9/2014 | Standwood et al. |
| 2015/0156782 A1 | 6/2015 | Manssour |
| 2015/0280888 A1 | 10/2015 | Karsi et al. |

OTHER PUBLICATIONS

Samsung, "Interference Measurement Table and Beam Coordination", 3GPP TSG RAN WG1 Meeting NR AH#3, R1-1716039, Nagoya, Japan, Sep. 18-21, 2017 (7 pages).

Zte, "Codebook based UL transmission", 3GPP TSG RAN WG1 Meeting #89, R1-1707113, Hangzhou, P.R. China, May 15-19, 2017 (5 pages).

International Search Report and Written Opinion dated Apr. 27, 2020 in International Application No. PCT/SE2019/050683 (9 pages total).

INTERFERENCE HANDLING AT RADIO ACCESS NETWORK NODES

CROSS REFERENCE TO RELATED APPLICATION

This application is a 35 U.S.C. § 371 National Stage of International Patent Application No. PCT/SE2019/050683, filed Jul. 9, 2019.

TECHNICAL FIELD

Embodiments presented herein relate to methods, radio access network nodes, computer programs, and a computer program product for interference handling.

BACKGROUND

Wireless cellular networks are built up of cells, each cell defined by a certain coverage area of a radio access network node (RAN node). The RAN node communicates wirelessly with user equipment (UE) served by the wireless cellular network. Communication is carried out in either paired or unpaired frequency spectrum. In case of paired frequency spectrum, the downlink (DL; from RAN node towards UE) and uplink (UL; from UE towards RAN node) directions are separated in frequency, thus utilizing Frequency Division Duplex (FDD). In case of unpaired frequency spectrum, the DL and UL use the same frequency spectrum but are separated in time, thus utilizing Time Division Duplex (TDD). A guard period (GP) might reduce DL-to-UL interference between RAN nodes by allowing a certain propagation delay between cells without having the DL transmission of a first RAN node enter the UL reception of a second RAN node.

Networks utilizing TDD might typically be operated in a synchronized and aligned fashion where the symbol timing is aligned and a semi-static TDD UL/DL pattern is used which is the same for all the cells in the NW. By aligning UL and DL periods so that they do not occur simultaneously the interference between UL and DL might be reduced.

Coordination between mobile network operators might be difficult to achieve. Further, defining a fixed TDD pattern for all RAN nodes might result in a waste of resources.

The support for dynamic TDD enables communication based on the fifth generation, or new radio (NR), air interface to maximally utilize available radio resource in the most efficient way for both traffic directions. However, although dynamic TDD brings significant performance gain at low to medium loads, the performance benefits become smaller as the traffic load increases due to the interference.

Hence, there is still a need for an improved handling of interference.

SUMMARY

An object of embodiments herein is to provide efficient interference handling.

According to a first aspect there is presented a method for interference handling. The method is performed by a network node. The method comprises obtaining an indication of interference in a time/frequency interval. The method comprises querying a neighbouring network node about scheduling in the time/frequency interval of uplink wireless transmission from any terminal device served by the neighbouring network node. The method comprises receiving a response from the neighbouring network node. The response comprises information identifying uplink reference signal resources/ports, and their scheduling, as to be used by the terminal device scheduled in the time/frequency interval.

According to a second aspect there is presented a network node for interference handling. The network node comprises processing circuitry. The processing circuitry is configured to cause the network node to obtain an indication of interference in a time/frequency interval. The processing circuitry is configured to cause the network node to query a neighbouring network node about scheduling in the time/frequency interval of uplink wireless transmission from any terminal device served by the neighbouring network node. The processing circuitry is configured to cause the network node to receive a response from the neighbouring network node. The response comprises information identifying uplink reference signal resources/ports, and their scheduling, as to be used by the terminal device scheduled in the time/frequency interval.

According to a third aspect there is presented a network node for interference handling. The network node comprises an obtain module (210a) configured to obtain an indication of interference in a time/frequency interval. The network node comprises a query module configured to query a neighbouring network node about scheduling in the time/frequency interval of uplink wireless transmission from any terminal device served by the neighbouring network node. The network node comprises a receive module configured to receive a response from the neighbouring network node. The response comprises information identifying uplink reference signal resources/ports, and their scheduling, as to be used by the terminal device scheduled in the time/frequency interval.

According to a fourth aspect there is presented a computer program for interference handling. The computer program comprises computer program code which, when run on processing circuitry of a network node, causes the network node to perform a method according to the first aspect.

According to a fifth aspect there is presented a method for interference handling. The method is performed by a network node. The method comprises receiving a query from a neighbouring network node about scheduling in a time/frequency interval of uplink wireless transmission from a terminal device served by the network node. The method comprises responding to the neighbouring network node with information identifying uplink reference signal resources/ports, and their scheduling, as to be used by the terminal device scheduled in the time/frequency interval.

According to a sixth aspect there is presented a network node for interference handling. The network node comprises processing circuitry. The processing circuitry is configured to cause the network node to receive a query from a neighbouring network node about scheduling in a time/frequency interval of uplink wireless transmission from a terminal device served by the network node. The processing circuitry is configured to cause the network node to respond to the neighbouring network node with information identifying uplink reference signal resources/ports, and their scheduling, as to be used by the terminal device scheduled in the time/frequency interval.

According to a seventh aspect there is presented a network node for interference handling. The network node comprises a receive module configured to receive a query from a neighbouring network node about scheduling in a time/frequency interval of uplink wireless transmission from a terminal device served by the network node. The network node comprises a respond module configured to respond to the neighbouring network node with information identifying uplink reference signal resources/ports, and their scheduling, as to be used by the terminal device scheduled in the time/frequency interval.

According to an eight aspect there is presented a computer program for interference handling, the computer program comprising computer program code which, when run on processing circuitry of a network node, causes the network node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these network nodes, and these computer programs provide efficient reporting of interference between network nodes.

Advantageously these methods, these network nodes, and these computer programs enable information about inter-cell interference to be taken into account when precoders and/or transmission beams to be selected for terminal devices. In turn, this will have a positive effect of the uplink system performance, thanks to reduced interference.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
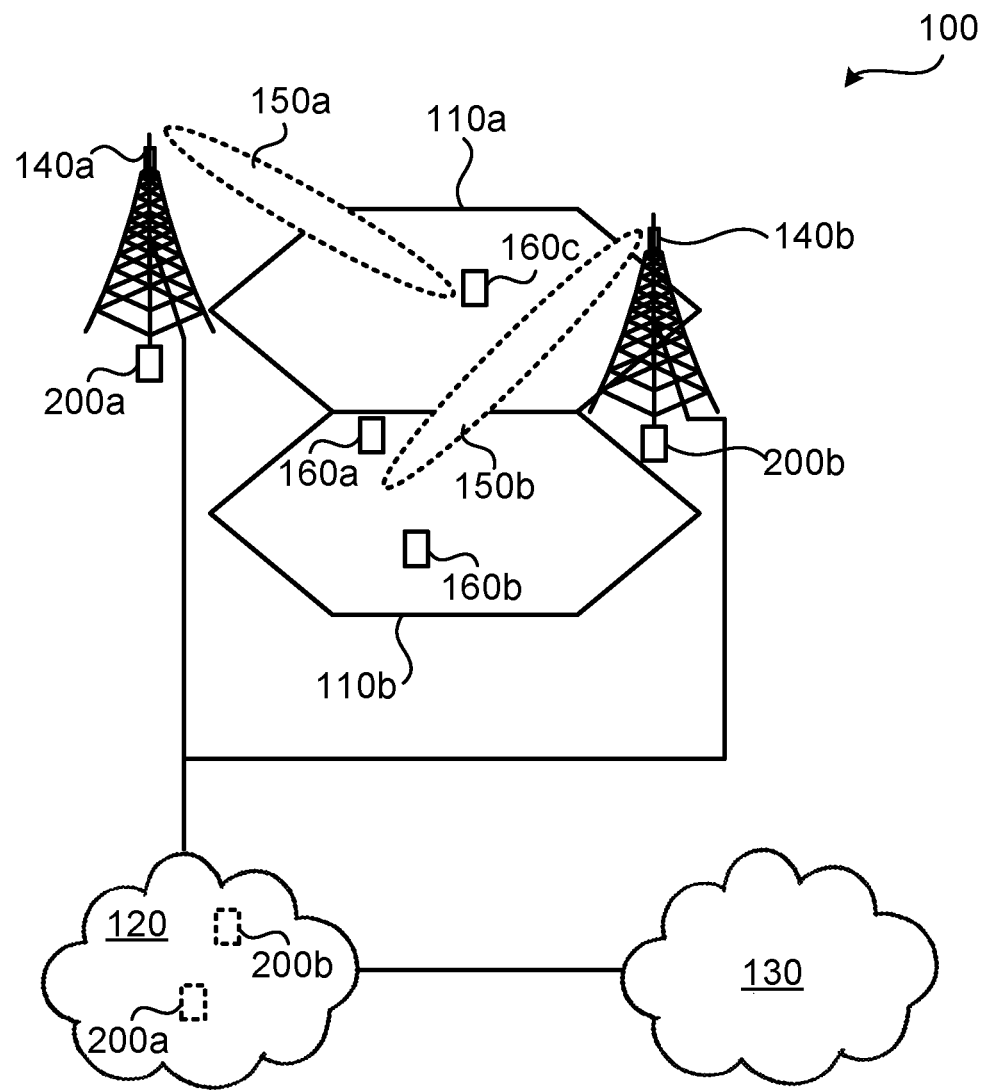
FIG. 1 is a schematic diagram illustrating a communication network according to embodiments.

FIG. 1 is a schematic diagram illustrating a communication network 100 where embodiments presented herein can be applied. The communication network 100 comprises two transmission and reception points (TRPs) 140a, 140b. Each radio TRP 140a, 140b serves terminal devices 160a, 160b, 160c in its own cell 110a, 110b. Cells 110a, 110b and the TRPs 140a, 140b collectively form a radio access network. The TRPs 140a, 140b are operatively connected to a core network 120 which in turn is operatively connected to a service network 130. The terminal devices 160a, 160b, 160c are thereby enabled to access services of, and exchange data with, the service network 130. Each TRP 140a, 140b is controlled by a respective network node 200a, 200b. Each network node 200a, 200b might be collocated with, integrated with, or part of, its controlled TRP 140a, 140b, which in combination could be a radio base station, base transceiver station, node B, evolved node B (eNB), NR base station (gNB), access point, or access node. In other examples the network nodes 200a, 200b are physically separated from the TRPs 140a, 140b. For example, one or more of the network nodes 200a, 200b might even be located in the core network 120. Regardless of their physical location in the communication network 100, the network nodes 200a, 200b are considered as neighbouring each other since they are configured to control TRPs 140a, 140b serving neighbouring cells 110a, 110b.

Each terminal device 160a, 160b, 160c could be a portable wireless device, mobile station, mobile phone, handset, wireless local loop phone, user equipment (UE), smartphone, laptop computer, tablet computer, wireless modem, wireless sensor device, Internet of Things (IoT) device, or network equipped sensor. In some examples network node 200a is configured for beamformed transmission and reception (as indicated by beam 150a). In some examples network node 200b is configured for beamformed transmission and reception (as indicated by beam 150b). In some examples at least one of the terminal devices 160a, 160b, 160c is configured for beamformed transmission and reception.

As disclosed above, there is a need for improved handling of interference. In particular, it could be that transmission in the uplink by terminal device 160a towards the TRP 140b of it serving network node 200b might cause interference to network node 200a since terminal device 160a is located close to the cell edge between cell 110b served by TRP 140b and cell 110a served by TRP 140a.

The embodiments disclosed herein thus relate to mechanisms for interference handling. In order to obtain such mechanisms there is provided a network node 200a, a method performed by network node 200a, a computer program product comprising code, for example in the form of a computer program, that when run on processing circuitry of network node 200a, causes network node 200a to perform the method. In order to obtain such mechanisms there is further provided a network node 200b, a method performed by network node 200b, and a computer program product comprising code, for example in the form of a computer program, that when run on processing circuitry of network node 200b, causes network node 200b to perform the method.

Figure 2:
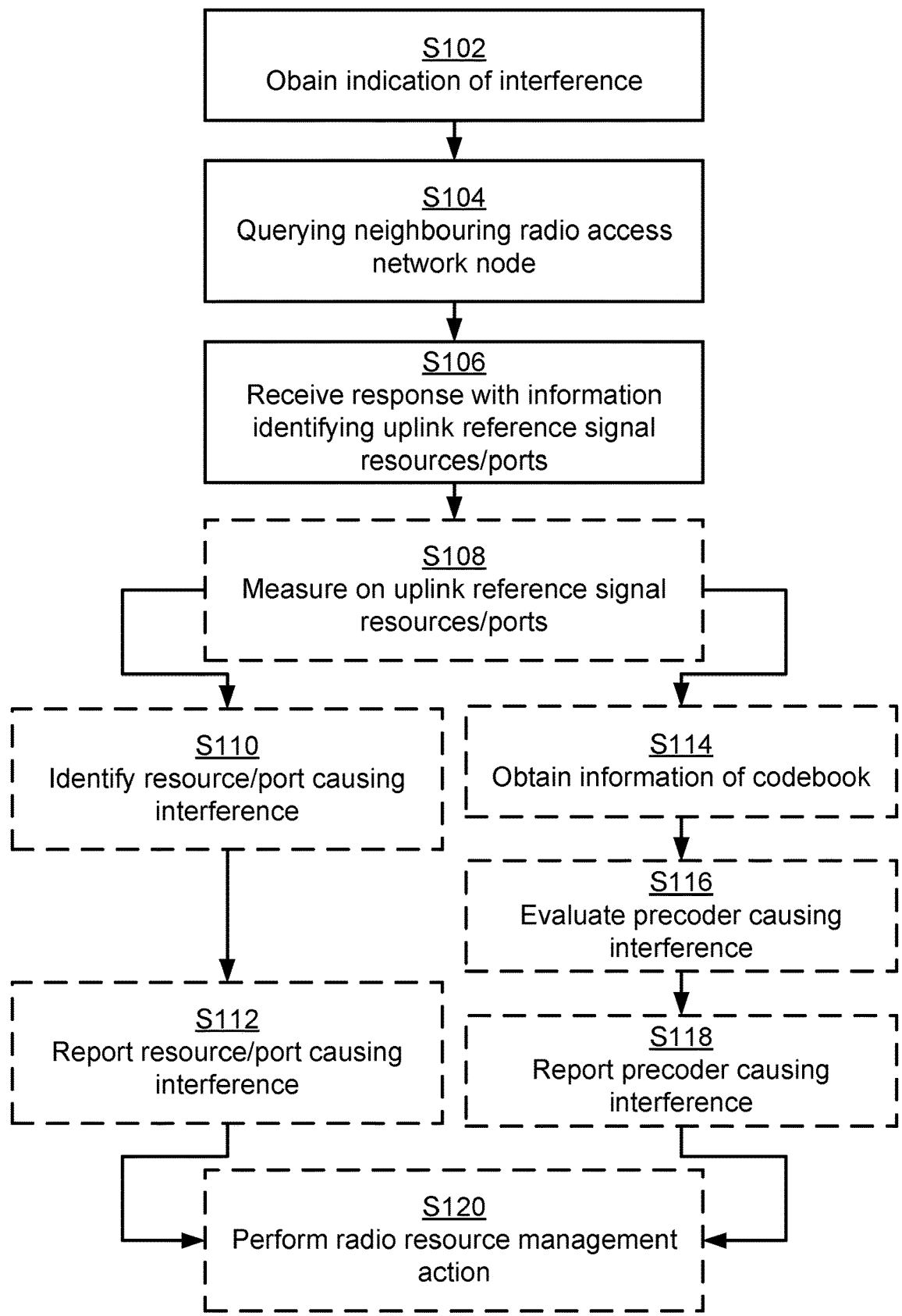
FIGS. 2 and 3 are flowcharts of methods according to embodiments.

Reference is now made to FIG. 2 illustrating a method for interference handling as performed by network node 200a according to an embodiment.

S102: Network node 200a obtains an indication of interference in a time/frequency interval. In some examples the indication is obtained by network node 200a itself detecting the interference e.g. through radio measurements in the time/frequency interval.

S104: Network node 200a queries neighbouring network node 200b about scheduling in the time/frequency interval of uplink wireless transmission from any terminal device 160a served by neighbouring network node 200b.

It is here understood that network node 200a might query more than one neighbouring network node 200b since which neighbouring network node 200b serving the terminal device 160a might be unknown to network node 200a. In this regard, if the terminal device causing the interference is not served by the first neighbouring radio access network node 200 queried by network node 200a, then network node 200b might query another neighbouring network node 200b and so on until the neighbouring network node 200b serving the terminal device is found. Alternatively, the query is sent to multiple neighbouring network nodes 200b in parallel.

S106: Network node 200a receives a response from neighbouring network node 200b. The response comprises information identifying uplink reference signal resources/ports, and their scheduling, as to be used by the terminal device 160a scheduled in the time/frequency interval.

Embodiments relating to further details of interference handling as performed by network node 200a will now be disclosed.

There may be different actions for network node 200a to perform once having received the response in S106. In some aspects network node 200a measures on SRS resources or ports and identifies the SRS resource or port causing the interference. That is, according to an embodiment, network node 200a is configured to perform (optional) steps S108, S110:

S108: Network node 200a measures on the uplink reference signal resources/ports as transmitted by the terminal device 160a according to the scheduling.

S110: Network node 200a identifies, from the measuring, which of the uplink reference signal resources/ports is causing the interference.

In some aspects network node 200a then reports the identified resources/ports causing the interference. That is, according to an embodiment, network node 200a is configured to perform (optional) step S112:

S112: Network node 200a reports the uplink reference signal resource/port causing the interference to neighbouring network node 200b.

Upon having reported the uplink reference signal resource/port causing the interference, network node 200b might inform network node 200a about parameters used by the terminal device 160a when causing the interference. In particular, according to an embodiment, network node 200a is configured to perform (optional) step S114:

S114: Network node 200a obtains information of which codebook the terminal device 160a is using for the uplink wireless transmission.

In some examples the codebook is a codebook for multiple input multiple output (MIMO) precoding.

Network node 200a might then use this information to identify any precoder that, if used by the terminal device 160a, will cause interference, and report any such precoder to neighbouring network node 200b. In particular, according to an embodiment, network node 200a is configured to perform (optional) steps S116 and S118:

S116: Network node 200a evaluates, from the measuring and the codebook, which precoder, that if used by the terminal device 160a, will cause interference.

S118: Network node 200a reports the precoder to neighbouring network node 200b.

In this, respect, there might be more than one precoder that, if used by the terminal device 160a, will cause interference. Hence, network node 200a might in S116 evaluate and identify more than one such precoder and in S118 report these one or more precoders.

This might enable avoidance of continued interference.

In some aspects, also the interference level is reported. That is, in some examples the reporting in S112 comprises information of the level of interference caused by the uplink reference signal resource/port.

In some aspects, network node 200a only reports resources/ports that cause severe interference to network node 200a. Severe interference might be defined by means of a threshold. In particular, in some examples, which of the uplink reference signal resources/ports is causing the interference only is reported when any of the uplink reference signal resources/ports is measured to be above a threshold value. The threshold value might be given with respect to any of: RSSI, RSRP, SINR, and RSRQ.

In some examples, as in FIG. 1, TRP 140a as controlled by network node 200a is configured for beamformed transmission and reception. The indication of interference might then be obtained for at least one beam 150a (as generated according to the beamformed transmission and reception).

Network node 200a might then control TRP 140a to either use this beam 150a or another beam when network node 200a performs the measurements as in S108. That is, according to a first example, the uplink reference signal resources/ports are measured on using the beam 150a for which the indication of interference was obtained. According to a second example, the uplink reference signal resources/ports are measured on using a beam being wider than, and covering, the beam 150a for which the indication of interference was obtained.

As will be disclosed below, network node 200b might perform a radio resource management action based on which precoder is causing the interference. However, it could be so that the radio resource management action taken by network node 200b does not reduce the interference experienced by network node 200a, or that network node 200b decides that no radio resource management action is to be taken, or that network node 200a is not enabled to perform S112 or S118. Therefore, in some aspects, network node 200a performs a radio resource management action to mitigate its experienced interference. That is, according to an embodiment, network node 200a is configured to perform (optional) step S114:

S120: Network node 200a performs a radio resource management action based on which of the uplink reference signal resources/ports is causing the interference.

Performing the radio resource management action might comprise adapting at least one of SRI, TPMI, TRI, and MCS for at least one terminal device 160c served by network node 200a. It is understood that the radio resource management action performed by network node 200a does involve any configuration of terminal devices not served by network node 200a.

There could be different examples of time/frequency intervals. In some aspects, the time/frequency interval is time-wise defined by a set of orthogonal frequency-division multiplexing (OFDM) symbols and frequency-wise defined by a set of resource blocks.

Figure 3:
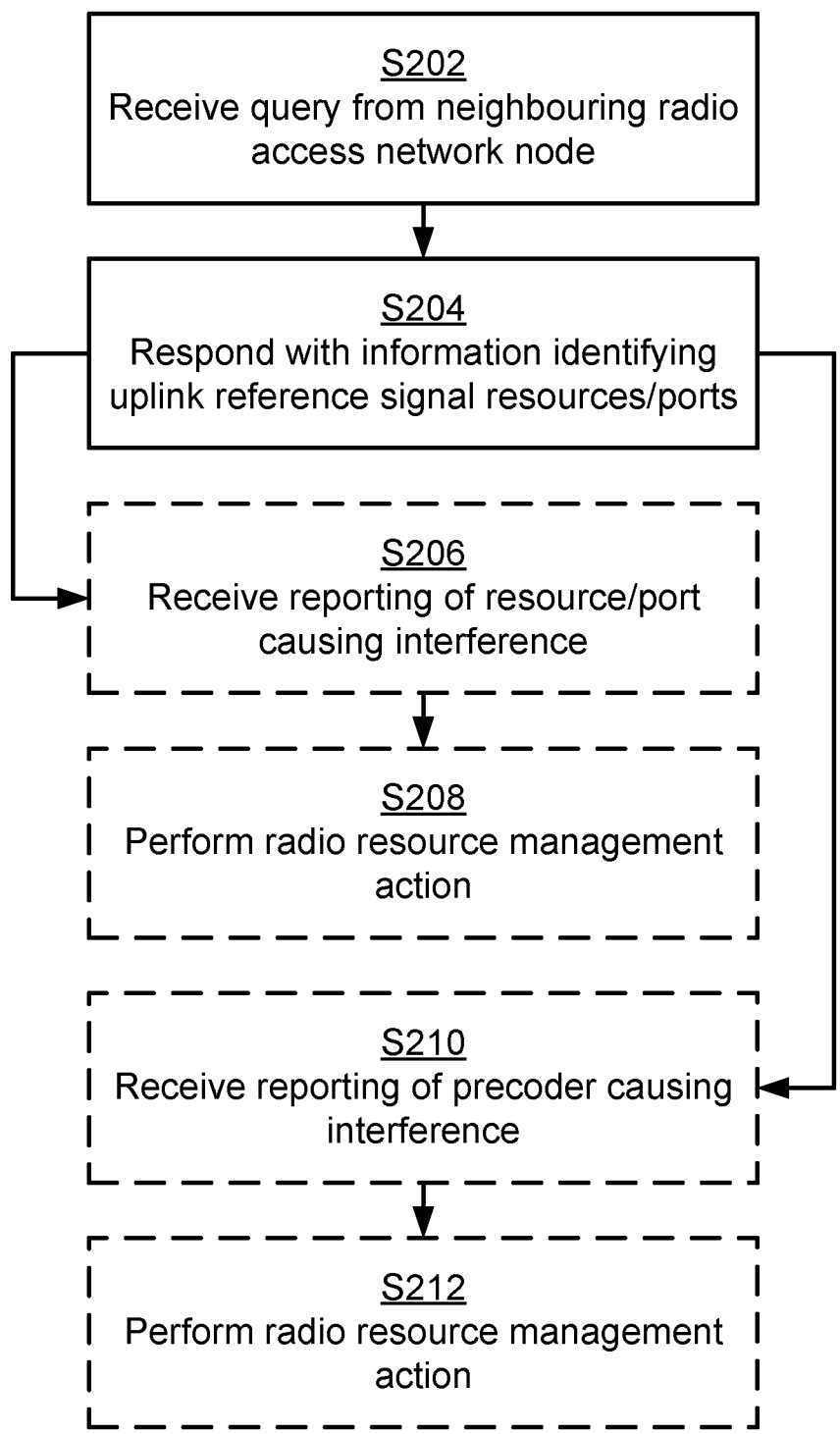

Reference is now made to FIG. 3 illustrating a method for interference handling as performed by network node 200b according to an embodiment.

As disclosed above, network node 200a queries network node 200b with regards to any terminal device being scheduled by network node 200b in a time/frequency interval. Hence, network node 200b is configured to perform step S202:

S202: Network node 200b receives a query from neighbouring network node 200a about scheduling in a time/frequency interval of uplink wireless transmission from a terminal device 160a served by network node 200b.

It is here assumed that network node 200b indeed serves such a terminal device 160a. Hence, network node 200b is configured to perform step S204:

S204: Network node 200b responds to neighbouring network node 200a with information identifying uplink reference signal resources/ports, and their scheduling, as to be used by the terminal device 160a scheduled in the time/frequency interval.

Embodiments relating to further details of interference handling as performed by network node 200b will now be disclosed.

As disclosed above, network node 200a might in S112 report the uplink reference signal resource/port causing the interference. Hence, according to an embodiment, network node 200b is configured to perform (optional) step S206:

S206: Network node 200b receives reporting from neighbouring network node 200a of the uplink reference signal resource/port causing the interference.

Based on the reporting received in S206, network node 200b might then perform a radio resource management action. Particularly, according to an embodiment, network node 200b is configured to perform (optional) step S208:

S208: Network node 200b performs a radio resource management action based on which of the uplink reference signal resources/ports is causing the interference.

This could potentially reduce the amount of interference experienced by network node 200a.

As disclosed above, network node 200a might in S118 report a precoder that if used by the terminal device 160a will cause interference. Hence, according to an embodiment, network node 200b is configured to perform (optional) step S210:

S210: Network node 200b receives reporting from neighbouring network node 200a of which precoder that, if used by the terminal device 160a, will cause interference.

As above, there might be more than one precoder that, if used by the terminal device 160a, will cause interference. Hence, network node 200b might in S210 receive reporting of more than one such precoder.

Based on the reporting received in S210, network node 200b might then perform a radio resource management action. Particularly, according to an embodiment, network node 200b is configured to perform (optional) step S212:

S212: Network node 200b performs a radio resource management action based on which precoder will cause interference.

This could potentially reduce the amount of interference experienced by network node 200a.

There could be different types of radio resource management actions performed in S208 and S212. In some examples, performing the radio resource management action comprises adapting at least one of SRI, TPMI, TRI, and MCS for the terminal device 160a.

In some examples, network node 200b evaluates for how long time the radio resource management action is to be applied, or be active. This might be achieved by using doppler measurements, channel coherency time measurements, positioning information, and/or obtaining information from rotation/acceleration censors in terminal device 160a. The more static the terminal device 160a is, the longer time the reporting as received in any of S206 and S210 can be considered as reliable, and thus the longer the radio resource management action can be applied.

As above, in some aspects, the time/frequency interval is time-wise defined by a set of OFDM symbols and frequency-wise defined by a set of resource blocks.

Figure 4:
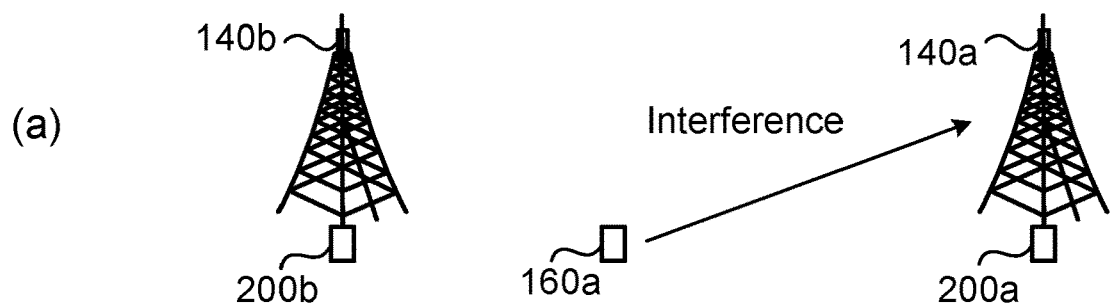
FIGS. 4 and 6 are schematic illustrations of part of the communication network of FIG. 1 according to embodiments.
Figure 4:
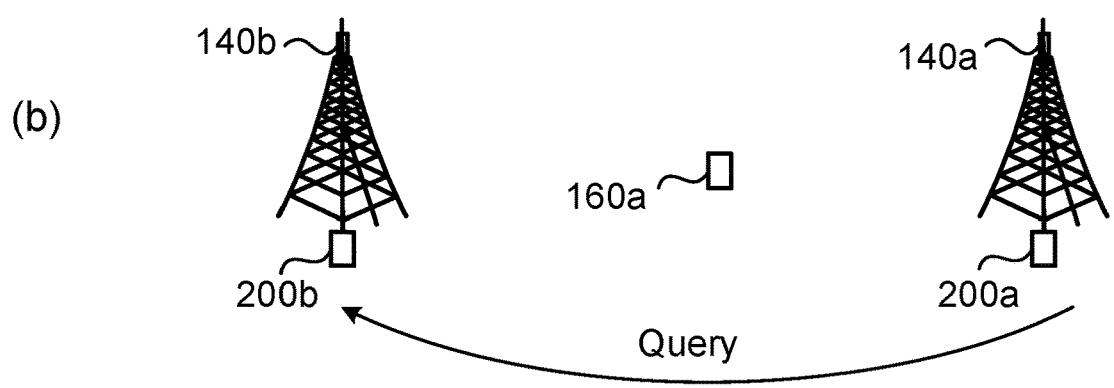
Figure 4:
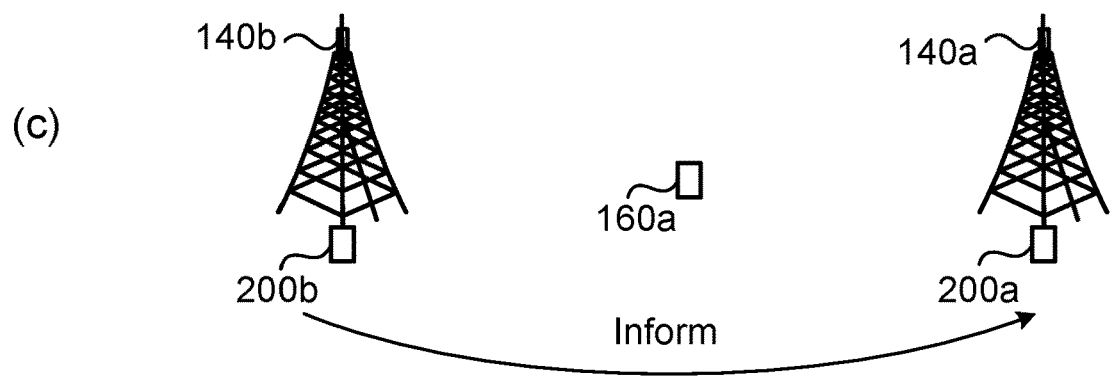
Figure 4:
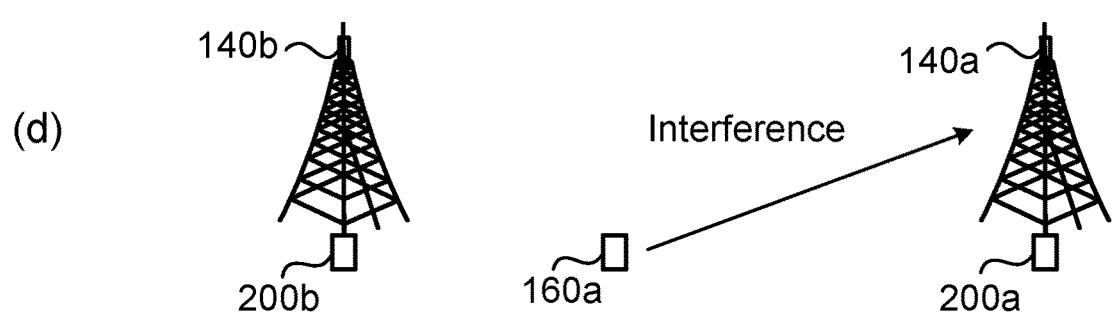
Figure 4:
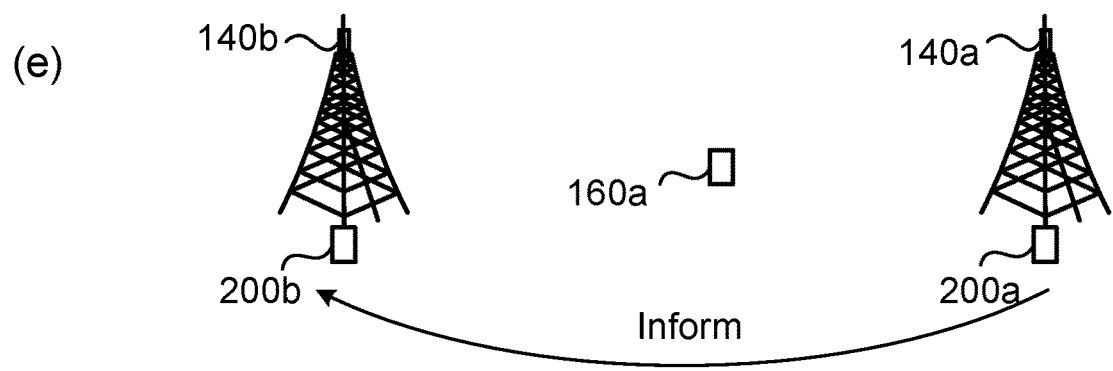
Figure 4:
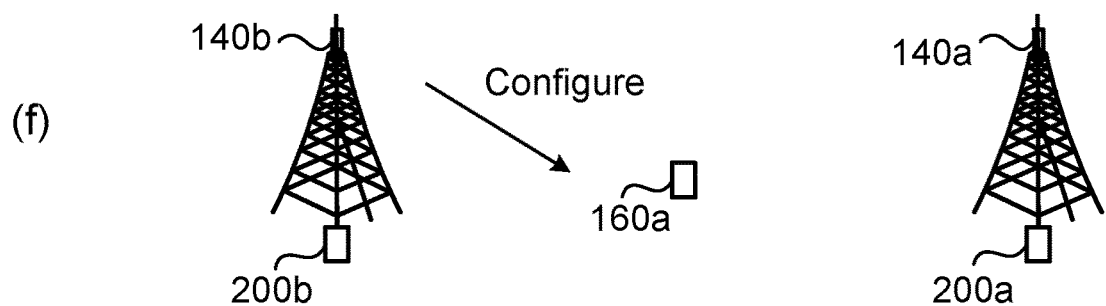
Figure 5:
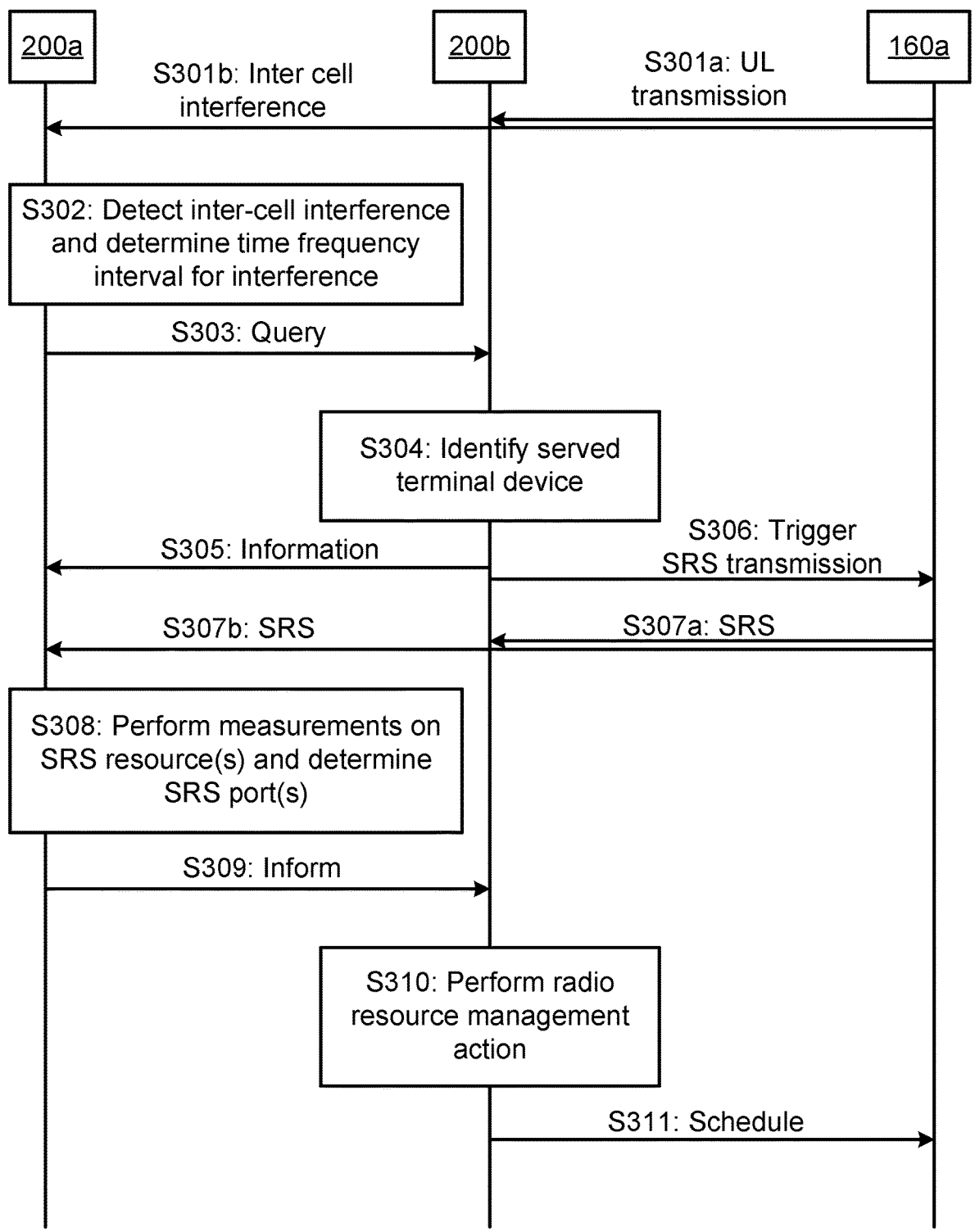
FIGS. 5 and 7 are signalling diagrams according to embodiments.

A first particular embodiment for interference handling based on at least some of the above disclosed embodiments will now be disclosed in detail with reference to FIG. 4 and FIG. 5.

Reference is now made to FIG. 4 illustrating part of the communication network of FIG. 1 together with steps performed as part of the first particular embodiment.

At (a), interference affected network node 200a detects that it is affected by inter-cell interference in the uplink. Network node 200a determines frequency and time location for the experienced inter-cell interference. At (b), network node 200a queries neighboring network node 200b if any of the terminal devices served by network node 200b performed an uplink transmission during that given time-frequency interval. The-time frequency interval might, for example, be defined by a number of OFDM symbols in time domain and a list of resource blocks in frequency domain. Network node 200b identifies that one of its served terminal devices performed an uplink transmission for the given time-frequency interval and at (c) signals to interference affected network node 200a a number of SRS resource(s) that the identified terminal device will use for future SRS transmissions and when in time the identified terminal device will transmit the SRS resource(s). At (d), the identified terminal device transmits the SRS resource (corresponding of 4 SRS ports in this example) and interference affected network node 200a performs measurements on the multiple SRS ports. For non-codebook based uplink transmissions, instead of using SRS ports, SRS resources are used. In the illustrative example of FIG. 4, interference affected network node 200a detects that SRS ports 2 and 3 generate strong interference and at (e) informs the neighboring network node 200b that SRS ports 2 and 3 generate strong interference. Optionally, network node 200a signals to network node 200b an indication of how strong the interference is from the two SRS ports. At (f), neighboring network node 200b schedules the terminal device for uplink data or control transmission and takes the information about the inter-cell interference into account when determining a suitable TPMI (or SRI in case of non-codebook based UL transmission) for terminal device. The selected TPMIs might, in order to reduce the inter-cell interference to interference affected network node 200a, not include uplink data or control transmission from SRS port 2 and 3.

According to an alternative of the first particular embodiment, interference affected radio transceiver device 200a directly evaluates and signals information about one or several TPMI(s) that generates significant interference, instead of determining and signaling information about which SRS ports, or SRS resource(s) that generate most interference. In this alternative, interference affected network node 200a needs to receive information that the terminal device is configured with codebook based uplink transmission and which codebook that the terminal device uses. The codebook used will depend on the number of transmission ports the terminal device is equipped with and the coherence capability of the terminal device. This alternative might be preferred, for example but not exclusively, if the terminal device is equipped with antennas configured for omni-directional transmission, which might be the case for transmission in low frequency bands, since for such terminal devices all SRS ports (for codebook based uplink transmission) will generate similar amounts of interference.

Reference is now made to the signalling diagram of FIG. 5.

S301a, S301b: Terminal device makes an uplink transmission to its served network node 200b. This causes inter-cell interference to network node 200a.

S302: Interference affected network node 200a detects that it experiences inter-cell interference in the uplink and determines within which time-frequency interval the interference was received in.

S303: Interference affected network node 200a queries neighboring network node 200b if network node 200b is serving a terminal device that had an uplink transmission within the indicated time-frequency interval.

S304: Neighbouring network node 200b identifies that one of its served terminal devices had an uplink transmission within the given time-frequency interval.

S305: Neighbouring network node 200b signals back to interference affected network node 200a one or several SRS resource(s) that network node 200a should perform measurements on and when these SRS resource(s) will be transmitted.

S306: Neighbouring network node 200b triggers SRS transmission of the identified terminal device 160a.

S307a, S307b: Terminal device 160a transmits the SRS resource(s) as triggered in S306.

S308: Interference affected network node 200a perform measurements on the received SRS resource(s) and determines which SRS ports (or SRS resource/TPMI) that generates inter-cell interference to network node 200a.

S309: Interference affected network node 200a informs neighboring network node 200b about which SRS ports (or SRS resource/TPMI) that generates inter-cell interference and, optionally, how strong inter-cell interference each SRS port (or SRS resource/TPMI) generates.

S310: Neighbouring network node 200b based on this information and the received SRS resource(s) performs a radio resource management action by determining SRI, TPMI, TRI and MCS to be used by the identified terminal device during coming uplink data and control transmission.

S311: Neighbouring network node 200b schedules terminal device 160a in accordance with the determined radio resource management action.

Figure 6:
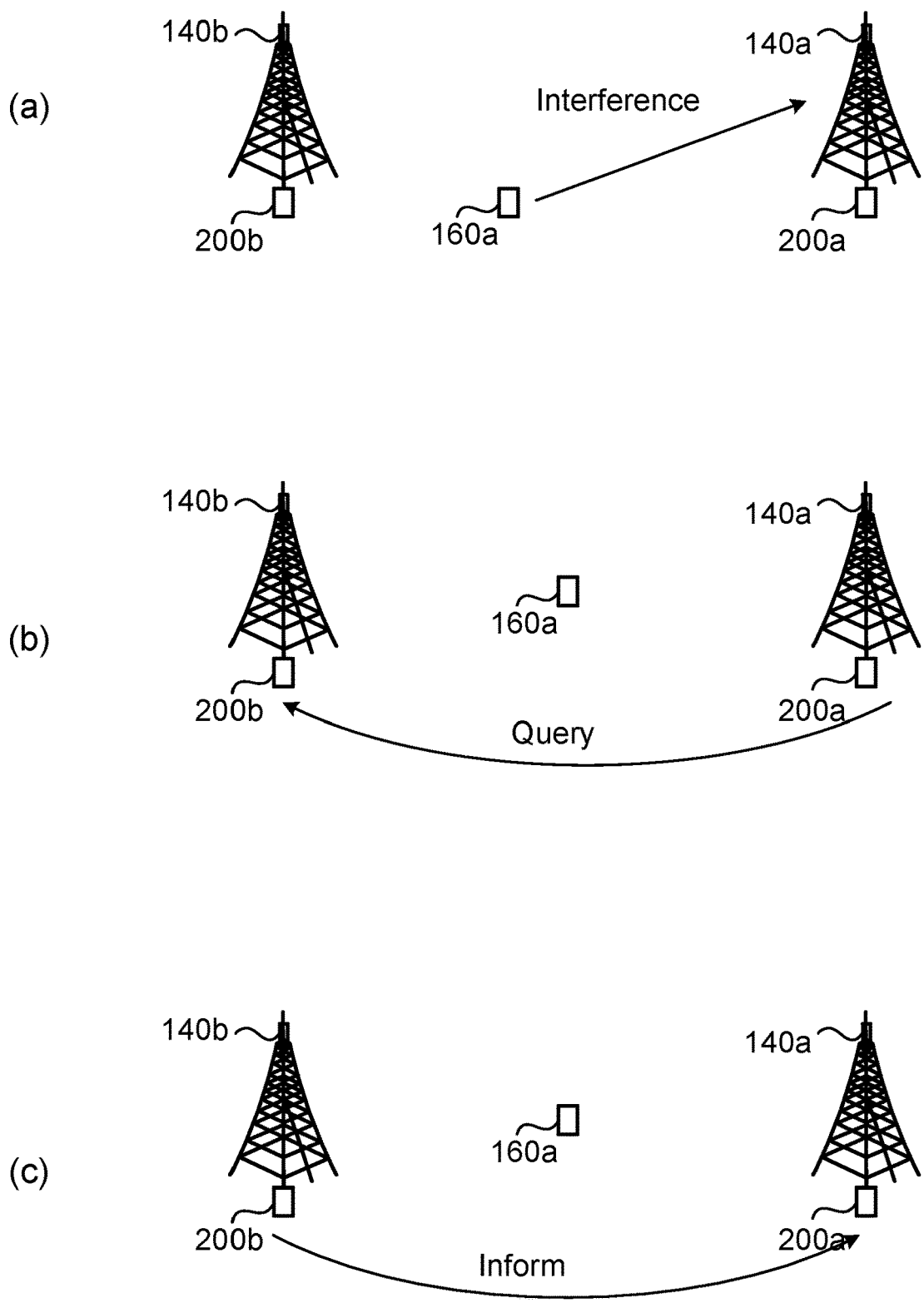
Figure 6:
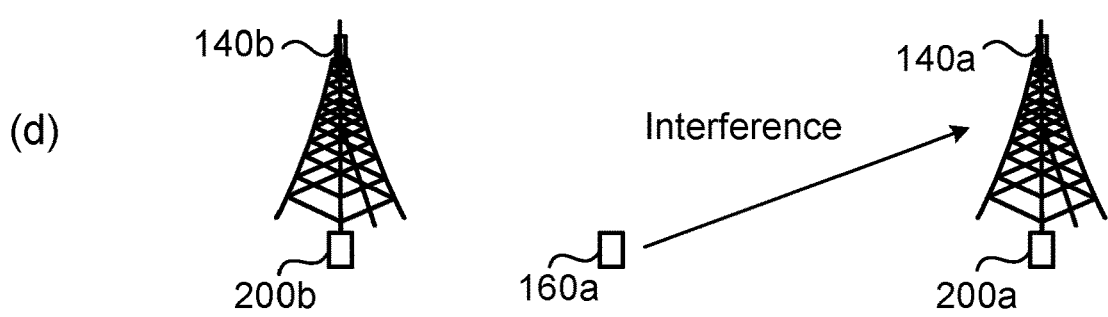
Figure 6:
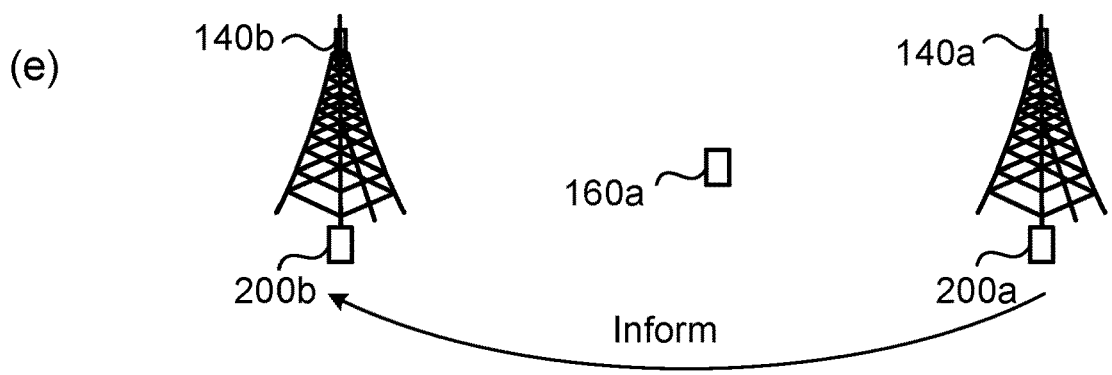
Figure 6:
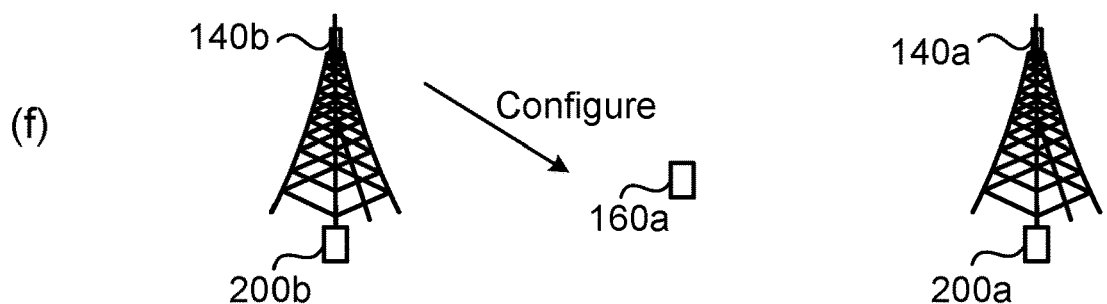
Figure 7:
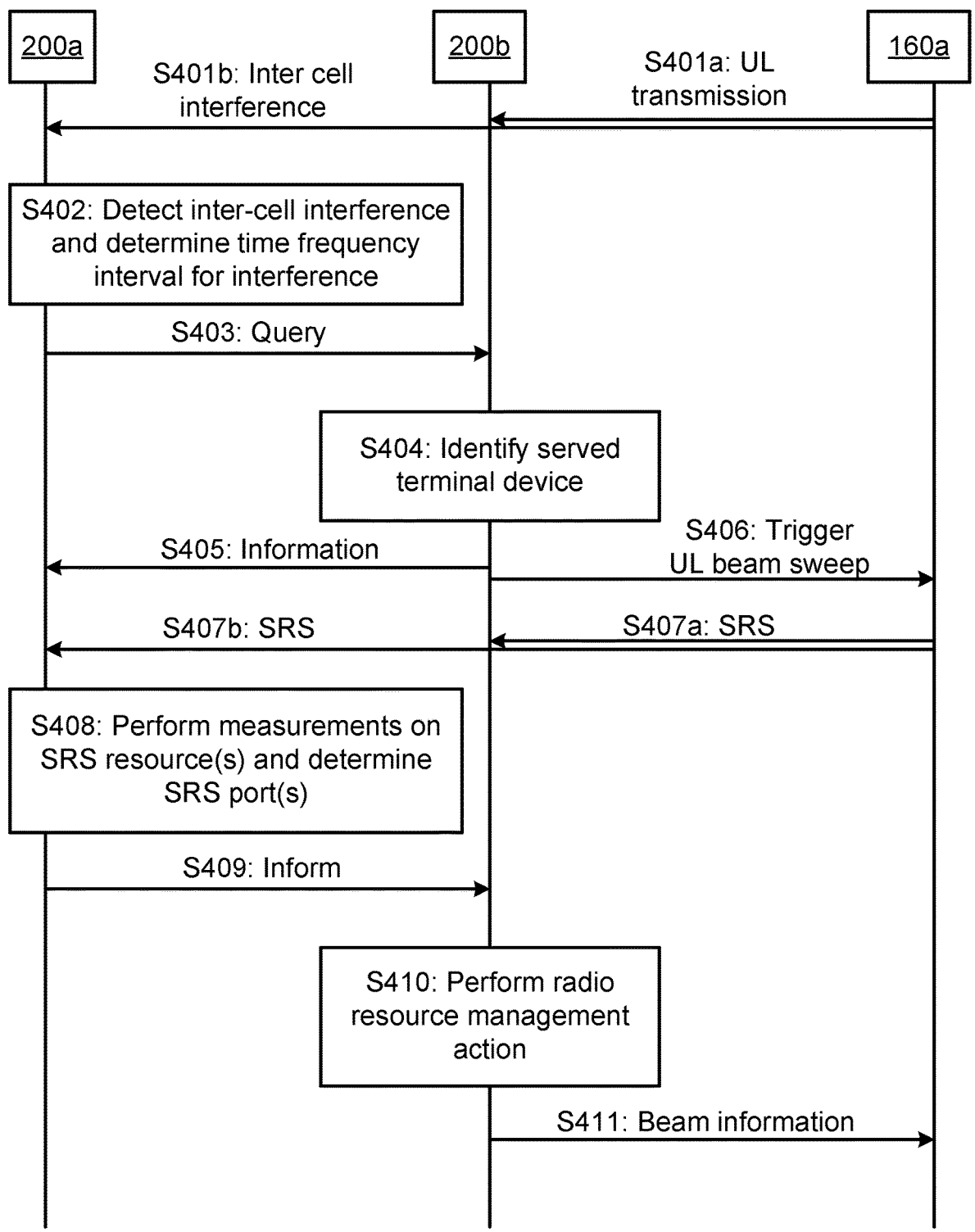

A second particular embodiment for interference handling based on at least some of the above disclosed embodiments will now be disclosed in detail with reference to FIG. 6 and FIG. 7.

Reference is now made to FIG. 6 illustrating part of the communication network of FIG. 1 together with steps performed as part of the second particular embodiment.

In this embodiment the terminal device is equipped with an analog panel (or in other words, an antenna array controlled by an analog beamforming network), which might be the case for mmWave frequencies. At (a), interference affected network node 200a detects that it is affected by inter-cell interference in the uplink. Network node 200a determines frequency and time location for the experienced inter-cell interference. At (b), network node 200a queries neighboring network node 200b if any of the terminal devices served by network node 200b performed an uplink transmission during that given time-frequency interval. The time frequency interval might, for example, be defined by a number of OFDM symbols in time domain and a list of resource blocks in frequency domain. Network node 200b identifies that one of its served terminal devices performed an uplink transmission for the given time-frequency interval and at (c) signals to interference affected network node 200a a number of SRS resource(s) that the identified terminal device will use for future uplink beam management beam sweeps and when in time these beam sweeps will be performed. At (d), the identified terminal device performs the uplink beam management beam sweep by transmitting SRS resources in different transmission beams, and interference affected network node 200a performs measurements on the multiple SRS resources. If network node 200a is equipped with an analog panel (or in other words, an antenna array controlled by an analog beamforming network), network node 200a needs to select a reception beam to be used during the reception of the SRS resource. In some example the network node 200a uses the same reception beam as used when the interference was detected. In other examples network node 200a applies a wide reception beam in which signals in a multitude of directions can be received during the reception of the SRS resources. Interference affected network node 200a detects that SRS resource 2 and 5 generate strong interference and at (e) it informs neighboring network node 200b that SRS resource 2 and 5 generate strong interference. Optionally, network node 200a signals to network node 200b an indication of how strong the interference is from the two SRS resources. At (f), neighboring network node 200b configures the terminal device to use a certain transmission beam for coming uplink data and control transmissions, taking into account the information about the inter-cell interference when determining the transmission beam so as to reduce the interference.

Reference is now made to the signalling diagram of FIG. 7.

S401a, S401b: Terminal device makes an uplink transmission to its served network node 200b. This causes inter-cell interference to network node 200a.

S402: Interference affected network node 200a detects that it experiences inter-cell interference in the uplink and determines within which time-frequency interval the interference was received in.

S403: Interference affected network node 200a queries neighboring network node 200b if network node 200b is serving a terminal device that had an uplink transmission within the indicated time-frequency interval.

S404: Neighbouring network node 200b identifies that one of its served terminal devices had an uplink transmission within the given time-frequency interval.

S405: Neighbouring network node 200b signals back to interference affected network node 200a one or several SRS resource(s) that network node 200a should perform measurements on and when these SRS resource(s) will be transmitted.

S406: Neighbouring network node 200b triggers an uplink beam sweep to be performed by the identified terminal device 160a.

S407a, S407b: Terminal device 160a transmits the SRS resource(s) in different transmission beams as triggered in S406.

S408: Interference affected network node 200a perform measurements on the received SRS resource(s) and determines which SRS resources (i.e. transmission beams used by the terminal device) that generates inter-cell interference to network node 200a.

S409: Interference affected network node 200a informs neighboring network node 200b about which SRS resources that generates inter-cell interference and, optionally, how strong inter-cell interference each SRS resource generates.

S410: Neighbouring network node 200b based on this information and the received SRS resources performs a radio resource management action by determining which transmission beam(s) to be used by the identified terminal device during coming uplink data and control transmission.

S411: Neighbouring network node 200b schedules terminal device 160a in accordance with the determined radio resource management action by transmitting beam information relating to which transmission beam(s) is/are to be used to terminal device 160a.

Figure 8:
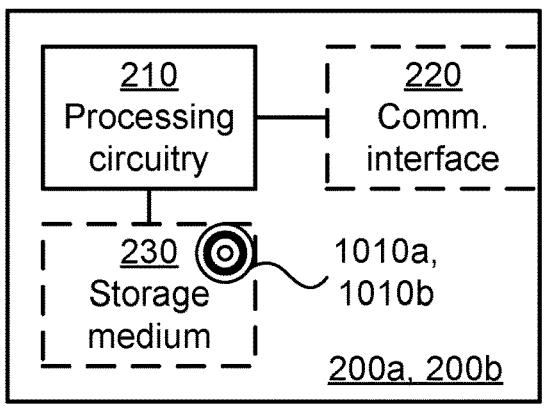
FIG. 8 is a schematic diagram showing functional units of a network node according to an embodiment.

FIG. 8 schematically illustrates, in terms of a number of functional units, the components of a network node 200a, 200b according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause network node 200a, 200b to perform a set of operations, or steps, as disclosed above. For example, the storage medium 230 may store the set of operations, and the processing circuitry 210 may be configured to retrieve the set of operations from the storage medium 230 to cause network node 200a, 200b to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. Network node 200a, 200b may further comprise a communications interface 220 at least configured for communications with other entities, nodes, functions, and devices of the communication networks of FIGS. 1, 4 and 6. As such the communications interface 220 may comprise one or more transmitters and receivers, comprising analogue and digital components. The processing circuitry 210 controls the general operation of network node 200a, 200b e.g. by sending data and control signals to the communications interface 220 and the storage medium 230, by receiving data and reports from the communications interface 220, and by retrieving data and instructions from the storage medium 230. Other components, as well as the related functionality, of network node 200a, 200b are omitted in order not to obscure the concepts presented herein.

Figure 9:
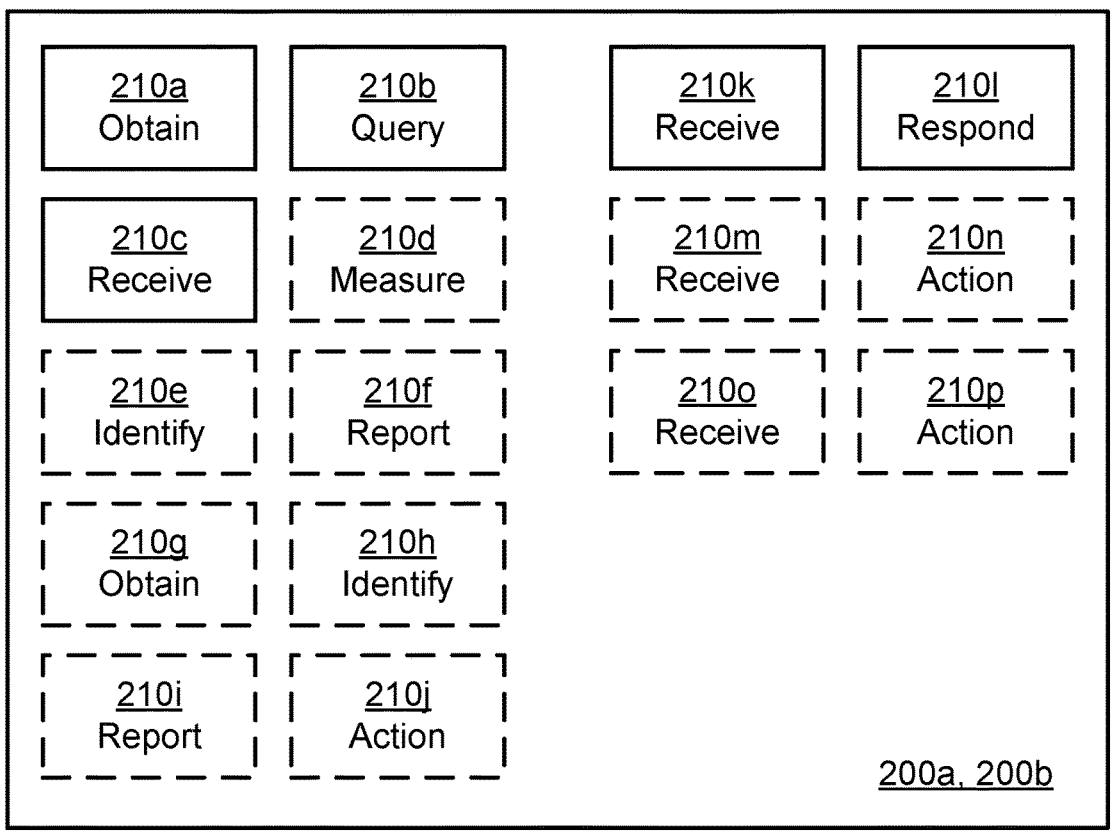
FIG. 9 is a schematic diagram showing functional modules of a network node according to an embodiment.

FIG. 9 schematically illustrates, in terms of a number of functional modules, the components of a network node 200a, 200b according to an embodiment. Network node 200a, 200b of FIG. 9 comprises a number of functional modules.

When configured to perform the methods of FIG. 2 network node 200a comprises an obtain module 210a configured to perform step S102, a query module 210b configured to perform step S104, and a receive module 210c configured to perform step S106. When configured to perform the methods of FIG. 2 network node 200a may further comprise a number of optional functional modules, such as any of a measure module 210d configured to perform step S108, an identify module 210e configured to perform step S110, a report module 210f configured to perform step S112, an obtain module 210g configured to perform step S114, an identify module 210h configured to perform step S116, a report module 210i configured to perform step S118, and an action module 201j configured to perform step S120.

When configured to perform the methods of FIG. 3 network node 200b comprises a receive module 210k configured to perform step S202, and a respond module 210l configured to perform step S204. When configured to perform the methods of FIG. 3 network node 200b may further comprise a number of optional functional modules, such as any of a receive module 210m configured to perform step S206, an action module 210n configured to perform step S208, a receive module 210o configured to perform step S210, and an action module 210p configured to perform step S212.

In general terms, each functional module 210a-210p may in one embodiment be implemented only in hardware and in another embodiment with the help of software, i.e., the latter embodiment having computer program instructions stored on the storage medium 230 which when run on the processing circuitry makes network node 200a, 200b perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210a-210p may be implemented by the processing circuitry 210, possibly in cooperation with the communications interface 220 and/or the storage medium 230. The processing circuitry 210 may thus be configured to from the storage medium 230 fetch instructions as provided by a functional module 210a-210p and to execute these instructions, thereby performing any steps as disclosed herein.

A first portion of the instructions performed by network node 200a, 200b may be executed in a first device, and a second portion of the of the instructions performed by network node 200a, 200b may be executed in a second device; the herein disclosed embodiments are not limited to any particular number of devices on which the instructions performed by network node 200a, 200b may be executed. Hence, the methods according to the herein disclosed embodiments are suitable to be performed by a network node 200a, 200b residing in a cloud computational environment. Therefore, although a single processing circuitry 210 is illustrated in FIG. 8 the processing circuitry 210 may be distributed among a plurality of devices, or nodes. The same applies to the functional modules 210a-210p of FIG. 9 and the computer programs 1020a, 1020b of FIG. 10.

Figure 10:
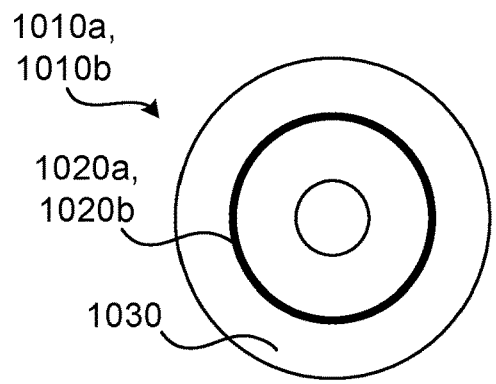
FIG. 10 shows one example of a computer program product comprising computer readable storage medium according to an embodiment.

FIG. 10 shows one example of a computer program product 1010a, 1010b comprising computer readable storage medium 1030. On this computer readable storage medium 1030, a computer program 1020a, 1020b can be stored, which computer program 1020a, 1020b can cause the processing circuitry 210 and thereto operatively coupled entities and devices, such as the communications interface 220 and the storage medium 230, to execute methods according to embodiments described herein. In particular, computer program 1020a can cause the processing circuitry 210 and thereto operatively coupled entities and devices, such as the communications interface 220 and the storage medium 230, to execute any of steps S102-S120.

In particular, computer program 1020b can cause the processing circuitry 210 and thereto operatively coupled entities and devices, such as the communications interface 220 and the storage medium 230, to execute any of steps S202-S212. The computer program 1020a, 1020b and/or computer program product 1010a, 1010b may thus provide means for performing any steps as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM), and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

Figure 11:
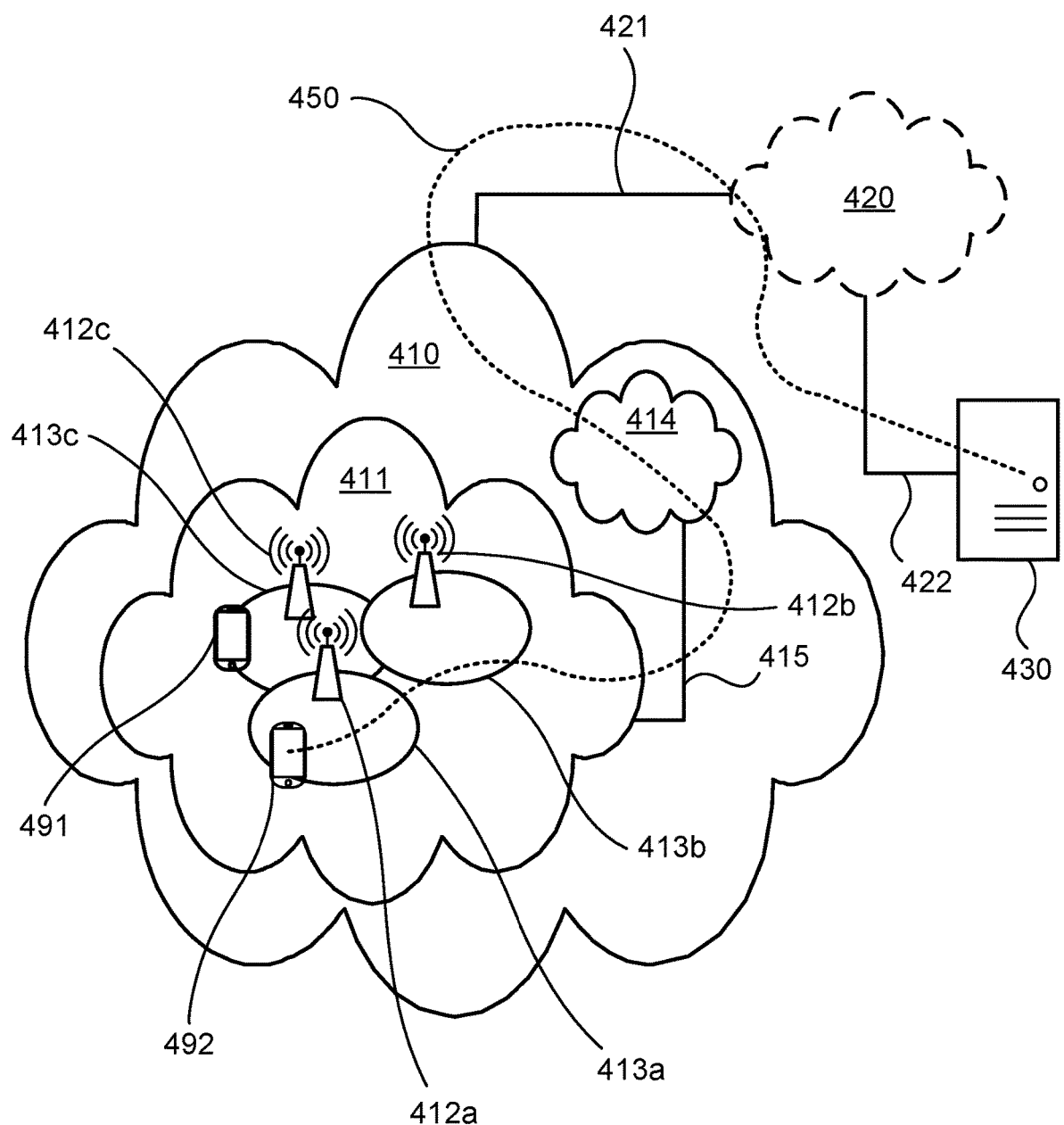
FIG. 11 is a schematic diagram illustrating a telecommunication network connected via an intermediate network to a host computer in accordance with some embodiments.

FIG. 11 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as the radio access network defined by the TRPs 140a, 140b and the cells 110a, 110b in FIG. 1, and core network 414, such as core network 120 in FIG. 1. Access network 411 comprises a plurality of radio access network nodes 412a, 412b, 412c, such as NBs, eNBs, gNBs (each corresponding to the radio access network nodes 200a, 200b of FIG. 1) or other types of wireless access points, each defining a corresponding coverage area, or cell, 413a, 413b, 413c. Each radio access network nodes 412a, 412b, 412e is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal devices 160a, 160b, 160c of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 11 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 12:
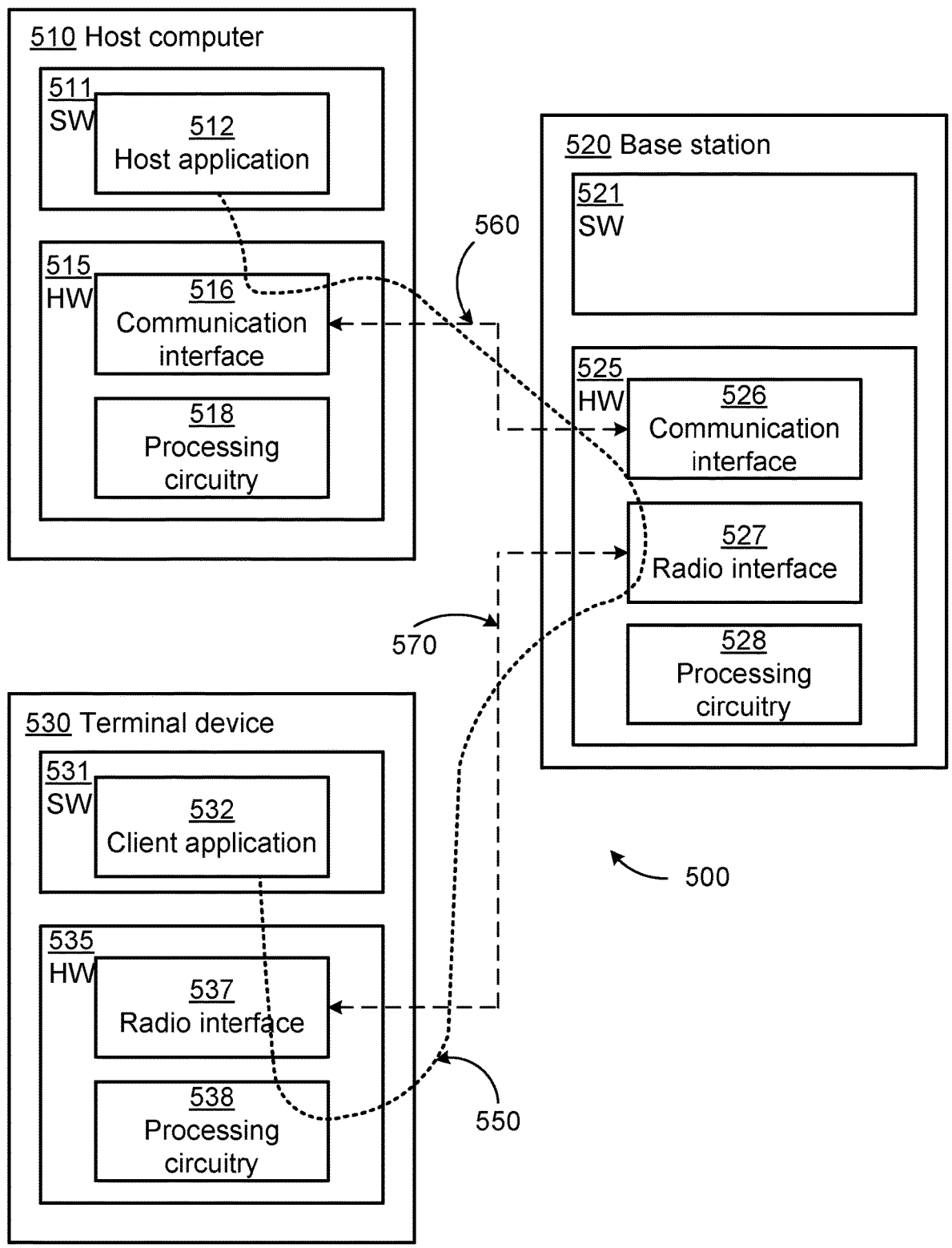
FIG. 12 is a schematic diagram illustrating host computer communicating via a radio base station with a terminal device over a partially wireless connection in accordance with some embodiments.

FIG. 12 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 12. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal devices 160a, 160b, 160c of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the radio access network nodes 200a, 200b of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by radio access network node 520. Communication interface 526 may be configured to facilitate connection 560 to host computer 510. Connection 560 may be direct or it may pass through a core network (not shown in FIG. 12) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 12 may be similar or identical to host computer 430, one of network nodes 412a, 412b, 412c and one of UEs 491, 492 of FIG. 11, respectively. This is to say, the inner workings of these entities may be as shown in FIG. 12 and independently, the surrounding network topology may be that of FIG. 11.

In FIG. 12, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both.

In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for interference handling, the method being performed by a network node, the method comprising:
   obtaining an indication of interference in a time/frequency interval;
   querying a neighbouring network node about scheduling in the time/frequency interval of uplink wireless transmission from any terminal device served by the neighbouring network node; and
   receiving a response from the neighbouring network node, the response comprising information identifying uplink reference signal resources/ports, and their scheduling, as to be used by the terminal device scheduled in the time/frequency interval.

2. The method of claim 1, further comprising:
   measuring on the uplink reference signal resources/ports as transmitted by the terminal device according to the scheduling; and
   identifying, from the measuring, which of the uplink reference signal resources/ports is causing the interference.

3. The method of claim 2, further comprising:
   reporting the uplink reference signal resource/port causing the interference to the neighbouring network node.

4. The method of claim 3, further comprising:
   obtaining information of which codebook the terminal device is using for the uplink wireless transmission;
   evaluating, from the measuring and the codebook, which precoder, that if used by the terminal device, will cause interference; and reporting said any precoder to the neighbouring network node, wherein the reporting comprises information of level of interference caused by the uplink reference signal resource/port.

5. The method of claim 3, wherein which of the uplink reference signal resources/ports is causing the interference only is reported when any of the uplink reference signal resources/ports is measured to be above a threshold value, and the threshold value is given with respect to any of: RSSI, RSRP, SINR, and RSRQ.

6. The method of claim 1, wherein the network node is configured for beamformed transmission and reception, and wherein the indication of interference is obtained for at least one beam.

7. The method of claim 2, wherein the network node is configured for beamformed transmission and reception, and wherein the indication of interference is obtained for at least one beam, and the uplink reference signal resources/ports are measured on using the beam for which the indication of interference was obtained.

8. The method of claim 2, wherein the network node is configured for beamformed transmission and reception, and wherein the indication of interference is obtained for at least one beam, and the uplink reference signal resources/ports are measured on using a beam being wider than, and covering, the beam for which the indication of interference was obtained.

9. The method of claim 1, further comprising:

performing a radio resource management action based on which of the uplink reference signal resources/ports is causing the interference, wherein performing the radio resource management action comprises adapting at least one of SRI, TPMI, TRI, and MCS for at least one terminal device served by the network node.

10. The method of claim 1, wherein the time/frequency interval is time-wise defined by a set of OFDM symbols and frequency-wise defined by a set of resource blocks.

11. A method for interference handling, the method being performed by a network node, the method comprising:

receiving a query from a neighbouring network node about scheduling in a time/frequency interval of uplink wireless transmission from a terminal device served by the network node; and responding to the neighbouring network node with information identifying uplink reference signal resources/ports, and their scheduling, as to be used by the terminal device scheduled in the time/frequency interval.

12. The method of claim 11, further comprising:

receiving reporting from the neighbouring network node of the uplink reference signal resource/port causing the interference; and performing a radio resource management action based on which of the uplink reference signal resources/ports is causing the interference.

13. The method of claim 11, further comprising:

receiving reporting from the neighbouring network node of which precoder that, if used by the terminal device, will cause interference.

14. The method of claim 13, further comprising:

performing a radio resource management action based on which precoder will cause interference.

15. The method of claim 14, wherein performing the radio resource management action comprises adapting at least one of SRI, TPMI, TRI, and MCS for the terminal device.

16. The method of claim 11, wherein the time/frequency interval is time-wise defined by a set of OFDM symbols and frequency-wise defined by a set of resource blocks.

17. A network node for interference handling, the network node comprising processing circuitry, the processing circuitry being configured to cause the network node to:

obtain an indication of interference in a time/frequency interval;

query a neighbouring network node about scheduling in the time/frequency interval of uplink wireless transmission from any terminal device served by the neighbouring network node; and receive a response from the neighbouring network node, the response comprising information identifying uplink reference signal resources/ports, and their scheduling, as to be used by the terminal device scheduled in the time/frequency interval.

18. A network node for interference handling, the network node comprising processing circuitry, the processing circuitry being configured to cause the network node to:

receive a query from a neighbouring network node about scheduling in a time/frequency interval of uplink wireless transmission from a terminal device served by the network node; and respond to the neighbouring network node with information identifying uplink reference signal resources/ports, and their scheduling, as to be used by the terminal device scheduled in the time/frequency interval.

19. A non-transitory computer readable medium storing a computer program for interference handling, the computer program comprising computer code which, when run on processing circuitry of a network node, causes the network node to:

obtain an indication of interference in a time/frequency interval;

query a neighbouring network node about scheduling in the time/frequency interval of uplink wireless transmission from any terminal device served by the neighbouring network node; and receive a response from the neighbouring network node, the response comprising information identifying uplink reference signal resources/ports, and their scheduling, as to be used by the terminal device scheduled in the time/frequency interval.

20. A non-transitory computer readable medium storing a computer program for interference handling, the computer program comprising computer code which, when run on processing circuitry of a network node, causes the network node to:

receive a query from a neighbouring network node about scheduling in a time/frequency interval of uplink wireless transmission from a terminal device served by the network node; and respond to the neighbouring network node with information identifying uplink reference signal resources/ports, and their scheduling, as to be used by the terminal device scheduled in the time/frequency interval.

* * * * *